US012684261B2

(12) United States Patent
Choi et al.

(10) Patent No.: US 12,684,261 B2
(45) Date of Patent: Jul. 14, 2026

(54) DEFECTIVE PIXEL CORRECTION DEVICE AND METHOD OF OPERATING THE SAME

(71) Applicant: SAMSUNG ELECTRONICS CO., LTD., Suwon-si (KR)

(72) Inventors: Chang Hoon Choi, Suwon-si (KR); Hyunyup Kwak, Suwon-si (KR); Jaeuk Ahn, Suwon-si (KR); Yongmi Lee, Suwon-si (KR); Seungwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 18/416,543

(22) Filed: Jan. 18, 2024

(65) Prior Publication Data

US 2024/0334084 A1      Oct. 3, 2024

(30) Foreign Application Priority Data

Mar. 28, 2023    (KR) ......................... 10-2023-0040778
Jul. 12, 2023    (KR) ......................... 10-2023-0090685

(51) Int. Cl.
*H04N 25/683*        (2023.01)
(52) U.S. Cl.
CPC .................................. *H04N 25/683* (2023.01)
(58) Field of Classification Search
CPC .............................. H04N 25/683; H04N 25/68
See application file for complete search history.

(56) References Cited

U.S. PATENT DOCUMENTS

| | | | | |
|---|---|---|---|---|
| 7,280,142 B2 * | 10/2007 | Toyoda ................ | H04N 25/683 |
| | | | 348/E5.081 |
| 7,920,186 B2 | 4/2011 | Forutanpour | |
| 8,358,319 B2 | 1/2013 | Cote et al. | |
| 8,971,659 B2 | 3/2015 | Forutanpour | |
| 9,131,196 B2 | 9/2015 | Lim et al. | |
| 10,158,815 B2 | 12/2018 | Aflalo et al. | |
| 10,666,884 B1 * | 5/2020 | Campbell ............ | H04N 25/683 |
| 2002/0176623 A1 | 11/2002 | Steinberg | |
| 2006/0164692 A1 | 7/2006 | Fujiwara et al. | |
| 2010/0073526 A1 * | 3/2010 | Watanabe .............. | H04N 25/68 |
| | | | 348/E9.037 |
| 2010/0086179 A1 | 4/2010 | Verboven et al. | |

(Continued)

OTHER PUBLICATIONS

Yap-Peng Tan et al., "A Robust Sequential Approach for the Detection of Defective Pixels in an Image Sensor," 1999 IEEE International Conference on Acoustics, Speech, and Signal Processing Proceedings, pp. 2239-2242.

(Continued)

*Primary Examiner* — Shahbaz Nazrul
(74) *Attorney, Agent, or Firm* — Sughrue Mion, PLLC

(57)        ABSTRACT

A defective pixel correction device is provided. The defective pixel correction device includes: a pixel grading circuit configured to output a grade map including a plurality of grades indicating defect levels and respectively corresponding to a plurality of pixels included in an input image; a pixel selection circuit configured to select one or more candidate pixels from among the plurality of pixels, based on whether the plurality of grades correspond to a correction level, in the grade map; and a correction circuit configured to correct the one or more candidate pixels.

16 Claims, 15 Drawing Sheets

(56) References Cited

U.S. PATENT DOCUMENTS

| | | | |
|---|---|---|---|
| 2010/0321537 A1 | 12/2010 | Zamfir et al. | |
| 2011/0002545 A1 | 1/2011 | Steinberg et al. | |
| 2011/0032393 A1* | 2/2011 | Yamaguchi | H04N 25/683 |
| | | | 348/E9.037 |
| 2011/0149123 A1* | 6/2011 | Matsuoka | H04N 25/68 |
| | | | 348/E9.037 |
| 2012/0133804 A1* | 5/2012 | Kim | H04N 25/683 |
| | | | 348/E9.042 |
| 2012/0182452 A1* | 7/2012 | Yasuma | H04N 1/4097 |
| | | | 348/246 |
| 2013/0329098 A1* | 12/2013 | Lim | H04N 23/88 |
| | | | 348/246 |
| 2014/0092280 A1 | 4/2014 | Tozawa | |
| 2015/0288935 A1* | 10/2015 | Shinozaki | H10F 39/8053 |
| | | | 348/322 |
| 2024/0292124 A1* | 8/2024 | Takaiwa | G01J 1/44 |

OTHER PUBLICATIONS

Anthony A. Tanbakuchi et al., "Adaptive Pixel Defect Correction," Sensors and Camera Systems for Scientific, Industrial, and Digital Photography Applications IV, Proceedings of SPIE-IS&T Electronic Imaging, SPIE vol. 5017 (2003), pp. 360-370.

Edward Chang et al., "Kernel-size selection for defect pixel identification and correction", Digital Photography III, SPIE-IS&T Electronic Imaging, SPIE vol. 6502, pp. 178-187 (Total 10 pages).

Noha El-Yamany et al., "Robust Defect Pixel Detection and Correction for Bayer Imaging Systems," IS&T International Symposium on Electronic Imaging 2017 Digital Photography and Mobile Imaging XIIII, pp. 46-51.

Liu Yongji et al., "A Design of Dynamic Defective Pixel Correction for Image Sensor," 2020 IEEE International Conference on Artificial Intelligence and Information Systems (ICAIIS), pp. 713-716.

Jeehoon An et al., "Adaptive Detection and Concealment Algorigthm of Defective Pixel," 2007 IEEE Workshop on Signal Processing Systems, pp. 651-656.

* cited by examiner

A

■ Grade 1

▨ Grade 2

□ Grade 3

Figure 10:
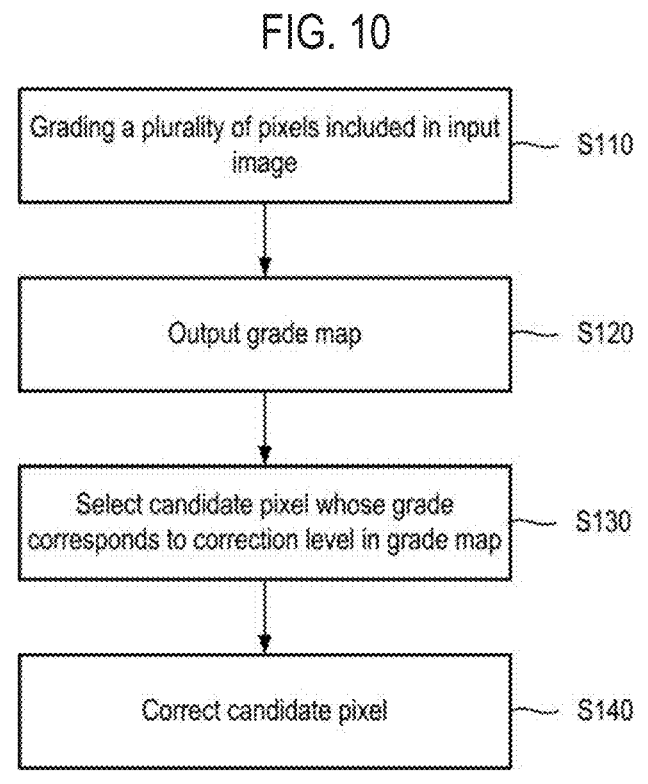

Grading a plurality of pixels included in input image — S110

Output grade map — S120

Select candidate pixel whose grade corresponds to correction level in grade map — S130

Correct candidate pixel — S140

FIG. 11

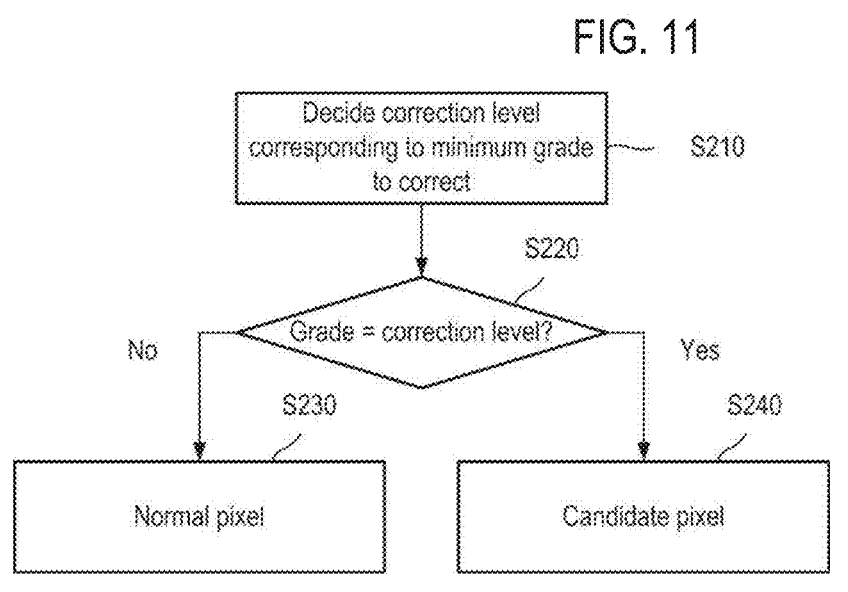

Decide correction level
corresponding to minimum grade
to correct — S210

Grade = correction level? S220

No

Yes

Normal pixel S230

Candidate pixel S240

FIG. 12

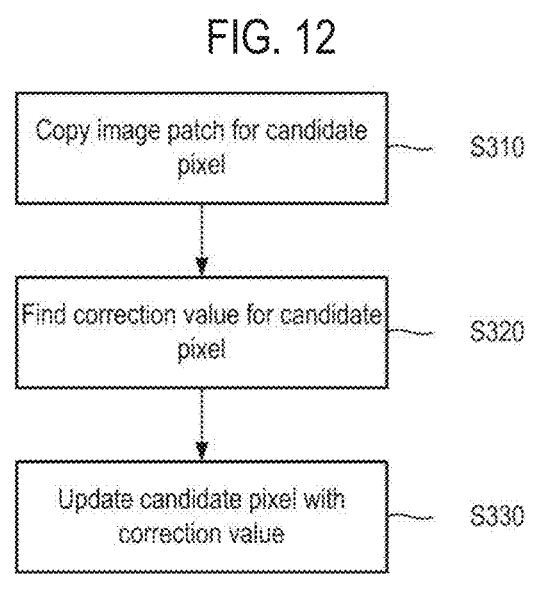

Copy image patch for candidate pixel — S310

Find correction value for candidate pixel — S320

Update candidate pixel with correction value — S330

DEFECTIVE PIXEL CORRECTION DEVICE AND METHOD OF OPERATING THE SAME

CROSS-REFERENCE TO RELATED APPLICATIONS

This application claims priority under to Korean Patent Application Nos. 10-2023-0040778, filed on Mar. 28, 2023, and 10-2023-0090685, filed on Jul. 12, 2023, in the Korean Intellectual Property Office, the disclosures of which are herein incorporated by reference in their entireties.

BACKGROUND

One or more example embodiments relate to a defective pixel correction device and a method of operating the same.

Defective pixels may occur on an image sensor due to a variety of reasons, including fabrication defects, or operation failures. A pixel correction function may be supported by an image signal processor, and may be used to correct such defective pixels. The pixel correction function may include a correction process to correct pixels and a detection process to detect pixel issues, including defective pixels. In this case, a detection process according to the related art requires a correction value to operate, so that detection process and correction processes are performed substantially or nearly simultaneously. Accordingly, the detection process according to the related art requires an intense workload of checking correction values for all pixels to detect defective pixels.

SUMMARY

One or more example embodiments provide a defective pixel correction device and a method of operating the same.

According to an aspect of an example embodiment, a defective pixel correction device includes: a pixel grading circuit configured to output a grade map including a plurality of grades indicating defect levels and respectively corresponding to a plurality of pixels included in an input image; a pixel selection circuit configured to select one or more candidate pixels from among the plurality of pixels, based on whether the plurality of grades correspond to a correction level, in the grade map; and a correction circuit configured to correct the one or more candidate pixels.

According to an aspect of an example embodiment, a method of operating a defective pixel correction device includes: assigning a plurality of grades, among grades indicating defect levels, to a plurality of pixels included in an input image, respectively; outputting a grade map including the plurality of grades; selecting one or more candidate pixels from among the plurality of pixels, based on whether the plurality of grades correspond to a correction level, in the grade map; and correcting the one or more candidate pixels.

According to an aspect of an example embodiment, an electronic device includes: an image sensor; a pixel grading circuit configured to output a grade map including a plurality of pixels to which a grade, among a plurality of grades indicating defect levels, is assigned, based on the grade being assigned, wherein the plurality of pixels are included in an input image output from the image sensor; a pixel selection circuit configured to select one or more candidate pixels, having the grade corresponding to a correction level, in the grade map; and a correction circuit configured to correct the one or more candidate pixels.

BRIEF DESCRIPTION OF DRAWINGS

The above and other aspects, features, and advantages of the present disclosure will be more clearly understood from the following description, taken in conjunction with the accompanying drawings.

FIG. 8 is a diagram illustrating a defective pixel correction device according to an example embodiment.

FIG. 10 is a flowchart illustrating a method of operating a defective pixel correction device according to an example embodiment.

FIG. 11 is a flowchart illustrating a candidate pixel selection operation of a defective pixel correction device according to an example embodiment.

FIG. 12 is a flowchart illustrating a correction operation of a defective pixel correction device according to an example embodiment.

DETAILED DESCRIPTION

Hereinafter, example embodiments will be described with reference to the accompanying drawings. Embodiments described herein are example embodiments, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present.

Figure 1:
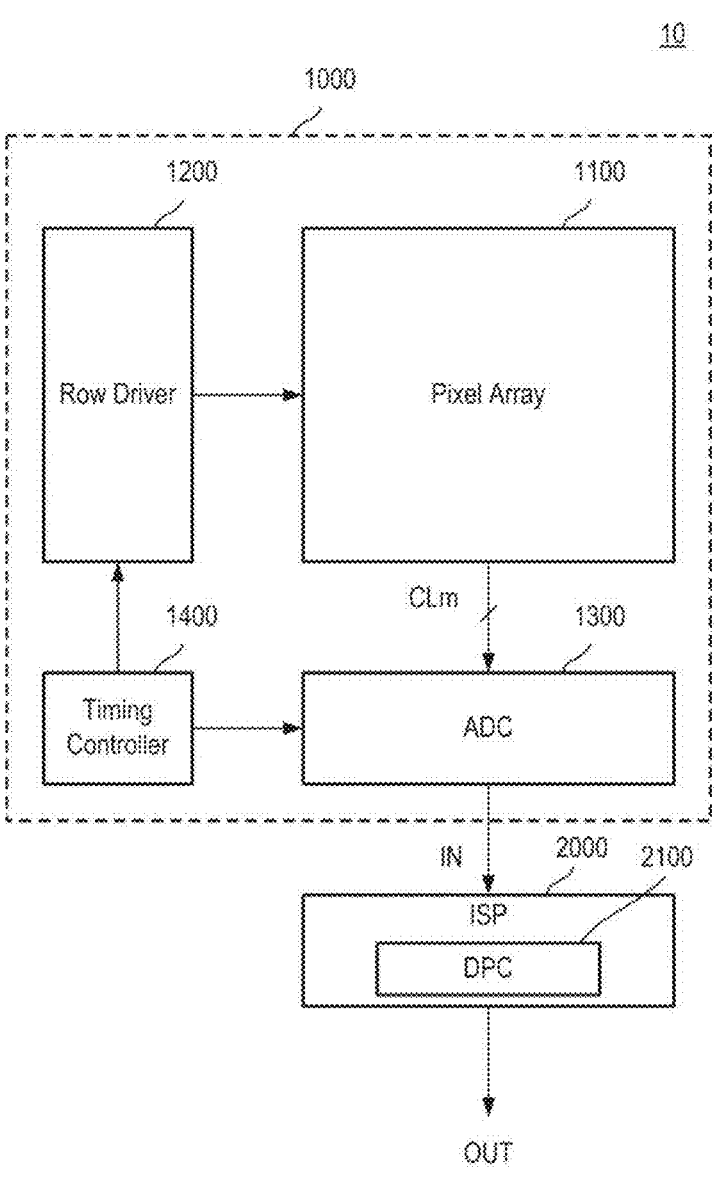
FIG. 1 is a diagram illustrating an image processing device according to an example embodiment.

FIG. 1 is a diagram illustrating an image processing device according to an example embodiment.

Referring to FIG. 1, an image processing device 10 according to an example embodiment may include an image sensor 1000 and an image signal processor (ISP) 2000. The image sensor 1000 and the image signal processor 2000 may be integrated on a single chip, or implemented as separate chips.

The image sensor 1000 may include a pixel array 1100, a row driver 1200, an analog-to-digital converter 1300, and a timing controller 1400.

The pixel array 1100 may output a plurality of pixel signals (for example, analog pixel signals) based on incident light. The pixel array 1100 may include a plurality of unit pixels arranged in a matrix of a plurality of rows and a plurality of columns.

The unit pixels may be arranged in an appropriate pattern for sensing a color image. For example, the unit pixels may be monochrome pixels sensing a range of visible light wavelengths. Each of the unit pixels may be combined with one of a red (R) filter, a green (G) filter, and a blue (B) filter. Also, the unit pixels may be implemented as pixels detecting a range of near infrared radiation (NIR) wavelengths. However, the range of wavelengths detectable by the unit pixels is not limited to the above examples.

In this case, a unit pixel combined with the G filter may be referred to as a G color pixel, a unit pixel combined with the R filter may be referred to an R color pixel, and a unit pixel combined with the B filter may be referred to as a B color pixel.

A signal, output from the unit pixel combined with the G filter, may indicate a G color value. A signal, output from the unit pixel combined with the R filter, may indicate an R color value. A signal, output from the unit pixel combined with the B filter, may indicate a B color value.

In complementary metal-oxide-semiconductor (CMOS) and charge-coupled device (CCD) image sensors, R, G, and B filters may be disposed in a regular pattern. As an example, the R, G, and B filters may be disposed in a Bayer pattern. In this case, the image sensor 1000 may provide RGB Bayer image data with which one of the R, G, and B colors is matched for each unit pixel.

As another example, the R, G, and B filters may be disposed in a quad Bayer pattern. In this case, the image sensor 1000 may provide tetra color filter array (CFA) image data with which a value of one of the R, G, and B colors is matched for each of four unit pixels arranged in a 2-by-2 array to constitute a 4-by-4 Bayer pattern.

However, the array of the unit pixels included in the pixel array 1100 is not limited to the above examples, and may be referred to as an RGBE pattern, an RGBW pattern, or an RGB-IR pattern.

An electrical signal, generated by each of the unit pixels, may be provided to the analog-to-digital converter 1300 through a plurality of column lines CLm.

The row driver 1200 may select a single row of the pixel array 1100 under the control of the timing controller 1400. For example, the row driver 1200 may drive a plurality of unit pixels included in the pixel array 1100 in units of rows.

A reset level signal, a sensing signal, or the like, generated from each unit pixel of the pixel array 1100, may be then transmitted to the analog-to-digital converter 1300.

The analog-to-digital converter 1300 may be connected to each column of the pixel array 11001 and may convert an analog signal, output from the pixel array 1100, into a digital signal. As an example, the analog-to-digital converter 1300 may include a plurality of analog-to-digital converters and may convert analog signals, output for each column line, into digital signals in parallel. As another example, the analog-to-digital converter 1300 may include a single analog-to-digital converter and may sequentially convert analog signals into digital signals. Hereinafter, the digital signals converted through the analog-to-digital converter 1300 may be referred to as an input image IN for ease of description. The input image IN may indicate a plurality of pixel values respectively corresponding to the unit pixels included in the pixel array 1100. The pixel values may be referred to as pixels.

The timing controller 1400 may control at least a portion of the pixel array 1100, the row driver 1200, and the analog-to-digital converter 1300. The timing controller 1400 may provide control signals, such as a clock signal and a timing control signal, to operations of the pixel array 1100, the row driver 1200, and the analog-to-digital converter 1300. The timing controller 1400 may include at least one of a logic control circuit, a phase lock loop (PLL) circuit, a timing control circuit, and a communication interface circuit.

The image signal processor 2000 may receive image data provided from the image sensor 1000, and may process the received image data. For example, the image signal processor 2000 may perform defective pixel correction, image interpolation, color correction, white balance, gamma correction, color conversion, or the like.

In an example embodiment, the image signal processor 2000 may include a defective pixel correction device 2100 to correct defective pixels which may be present in the input image IN. The defective pixel correction device 2100 may be configured to detect defective pixels from the input image IN and to correct the detected defective pixels. For example, the defective pixel correction device 2100 may perform grading of pixels, selection of defective pixels, and correction of the selected defective pixels.

The defective pixel correction device 2100 according to an example embodiment may be configured to completely separate the selection of defective pixels indicated by the input image IN, and the correcting of the defective pixels. For example, the defective pixel correction device 2100 may be configured to grade pixels, included in the input image IN through the pixel grading, and to perform the selection of the defective pixels based on the grades of the pixels.

When the pixel grading is not performed, a correction value CV (or an ideal value) for a defective pixel may be obtained, and the amount of a difference between the correction value CV and a current pixel value may be determined. Defective pixels may be selected based on the difference. For example, the selection and correction of defective pixels should be performed simultaneously for all pixels, which may incur significant power usage.

The image processing device 10 may include the defective pixel correction device 2100 which may select defective pixels through pixel grading without obtaining a correction value for the defective pixels. Therefore, the image processing device 10 may select defective pixels and correct only the selected defective pixels. In this regard, correction operations may not be performed for pixels that are not selected as defective pixels. Accordingly, operations associated with the defective pixels are simplified and power required for correction is reduced.

Figure 2:
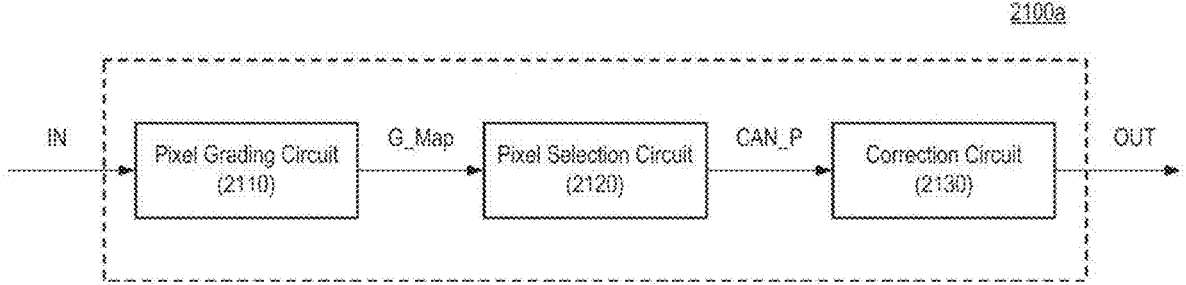
FIG. 2 is a diagram illustrating a defective pixel correction device according to an example embodiment.

FIG. 2 is a diagram illustrating a defective pixel correction device according to an example embodiment.

Referring to FIG. 2, a defective pixel correction device 2100a according to an example embodiment may correct defective pixels from an input image IN and may output an output image OUT in which the defective pixels are corrected. The defective pixel correction device 2100a may include a pixel grading circuit 2110, a pixel selection circuit 2120, and a correction circuit 2130.

The pixel grading circuit 2110 may perform grading on a plurality of pixels included in the input image IN. The plurality of pixels may be assigned to a grade, respectively, among a plurality of grades, based on the grading. In example embodiments, a grade assigned to a pixel may be used to categorize the severity of a suspected defect in a current pixel before correcting the current pixel, and may be understood as information representing the level of defect. Then, the assigned grade may be used as reference information for the pixel selection circuit 2120 and the correction circuit 2130.

The pixel grading circuit 2110 may assign a grade to each of the plurality of pixels according to various embodiments.

For example, the pixel grading circuit 2110 may assign a grade based on comparison between an average value or a median value of a plurality of neighboring pixels, included in an image patch, and a pixel value of a target pixel, among a plurality of pixels, with respect to the target pixel. The image patch may be a region required for operation with respect to a target pixel in the input image IN. For example, the image patch may have a size of M×N, where M and N may be positive integers that are the same or different from each other. A center of an image patch may be a target pixel. In the image patch, pixels other than the target pixel may be referred to as neighboring pixels. The pixel grading circuit 2110 may sort the target pixel and the neighboring pixels, calculate an average value or a median value of the sorted pixels, or extract a maximum value and/or a minimum value from among the sorted pixels.

For example, the pixel grading circuit 2110 may calculate a difference between a pixel value of the target pixel and the calculated average value or median value, and may assign a grade based on a degree approximated to the calculated difference. Alternatively, the pixel grading circuit 2110 may assign a grade based on a degree the pixel value of the target pixel, approximated to the maximum value or minimum value. Alternatively, the pixel grading circuit 2110 may perform the above-described grading technique according to the type of the input image IN (for example, the above-mentioned RGB, YUV, BGR, HSV, or the like) or the type of the input image IN (for example, the above-mentioned Bayer, Tetra, Nona, or the like), or other various techniques.

The pixel grading circuit 2110 may output a grade map G_Map, including a plurality of pixels to which grades are respectively assigned, according to example embodiments. Each of the grades may be assigned from among a plurality of grades. The grade map G_Map may have the same form (i.e., dimensions) as the input image IN, but each pixel may have one of the assigned grades rather than an original pixel value. For example, the grade map G_Map may indicate grades, rather than pixel values, that are mapped to pixels of the input image IN. For example, each pixel of the input image IN may be associated with a corresponding pixel of the grade map G_Map in a one-to-one correspondence.

The pixel selection circuit 2120 may be configured to select one or more candidate pixels CAN_P having a grade corresponding to a correction level in the grade map G_Map output through the pixel grading circuit 2110. Each of the candidate pixels CAN_P may be a pixel to be corrected by the correction circuit 2130. As a result, the pixel selection circuit 2120 may determine correction intensity of the input image IN.

The correction level for selecting the candidate pixel CAN_P may be set according to various embodiments.

In an example embodiment, the correction level may be preset to one or more grades among a plurality of grades. For example, when the plurality of grades include first to third grades, the correction level may be set to include at least one of the second to third grades. In this case, the pixel selection circuit 2120 may select pixels, corresponding to at least one of the second to third grades, from the grade map G_Map.

Alternatively, in an example embodiment, the correction level may be dynamically set through the pixel selection circuit 2120. For example, the pixel selection circuit 2120 may set at least one of the plurality of grades as a correction level based on a ratio of each of the plurality of grades in the grade map G_Map.

For example, the pixel selection circuit 2120 may set both the second to third grades as correction levels when the ratio of the second to third grades in the grade map G_Map is less than a specific ratio. Alternatively, the pixel selection circuit 2120 may set one of the second to third grades as the correction level when the ratio of the second to third grades in the grade map G_Map is greater than a specific ratio.

Alternatively, the pixel selection circuit 2120 may set the correction level based on information associated with a state of the input image IN (for example, illumination, noise information, or the like). For example, the pixel selection circuit 2120 may increase the number of grades included in the correction level when an illuminance value of the input image IN is less than or equal to a threshold value.

The above-described method of determining a correction level is only an example, and the pixel selection circuit 2120 may determine the correction level based on various other examples.

The correction circuit 2130 may be configured to correct one or more candidate pixels CAN_P. For example, the correction circuit 2130 may perform correction on only the one or more candidate pixels CAN_P selected from all pixels, included in the input image IN, through the pixel selection circuit 2120.

The correction circuit 2130 may correct each of the one or more candidate pixels CAN_P according to various embodiments.

In an example embodiment, the correction circuit 2130 may calculate a correction value based on one or more candidate pixels CAN_P, and a plurality of neighboring pixels included in an image patch which includes the one or more candidate pixels CAN_P. For example, the image patch may have a size of M×N, where M and N may be positive integers that are the same or different from each other. A center of the image patch may be one of the one or more candidate pixels CAN_P. For example, the correction circuit 2130 may calculate a correction value based on pixel information such as pixel values of the candidate pixel CAN_P and neighboring pixels, a color corresponding to a pixel value, an assigned grade, and the number of valid pixels among all pixels.

In an example embodiment, the correction circuit 2130 may use an average value or a median value of pixel values of pixels having the same color as the candidate pixel CAN_P, among the neighboring pixels, as a correction value. Alternatively, the correction circuit 2130 may use a pixel value closest to the pixel value of the candidate pixel CAN_P, among neighboring pixels, as a correction value.

In an example embodiment, the correction circuit 2130 may calculate a correction value through local channel compensation. The term "local channel compensation" may refer to compensation of an average value of all pixels in an image patch, regardless of color. For example, the correction circuit 2130 may use the corrected average value as a correction value.

In an example embodiment, the correction circuit 2130 may measure gradients of pixels included in the image patch, and may calculate a correction value based on pixels corresponding to a direction in which a measured pixel has a highest gradient.

In an example embodiment, the correction circuit 2130 may receive information for calculating a correction value from another device connected to the defective pixel correction device 2100a, and may calculate a correction value based on the received information.

The correction circuit 2130 is not limited to the above-described embodiments, and may calculate a correction value for correcting the candidate pixel CAN_P based on various other techniques.

The correction circuit 2130 may correct the candidate pixels CAN_P, included in the input image IN, to output an output image OUT in which the candidate pixels CAN_P are replaced with correction pixels.

Thus, the defective pixel correction device 2100a according to the above-described embodiments may select defective pixels through pixel grading without obtaining correction values for defective pixels. Then, the defective pixel correction device 2100a may perform calculation of correction values and perform correction for only the selected candidate pixels CAN_P, so that an operation associated with the defective pixels may be simplified and power costs may be reduced.

In addition, the defective pixel correction device 2100a according to example embodiments may dynamically set a grade to be applied with correction, in consideration of a state, or the like, of the input image IN.

Figure 3:
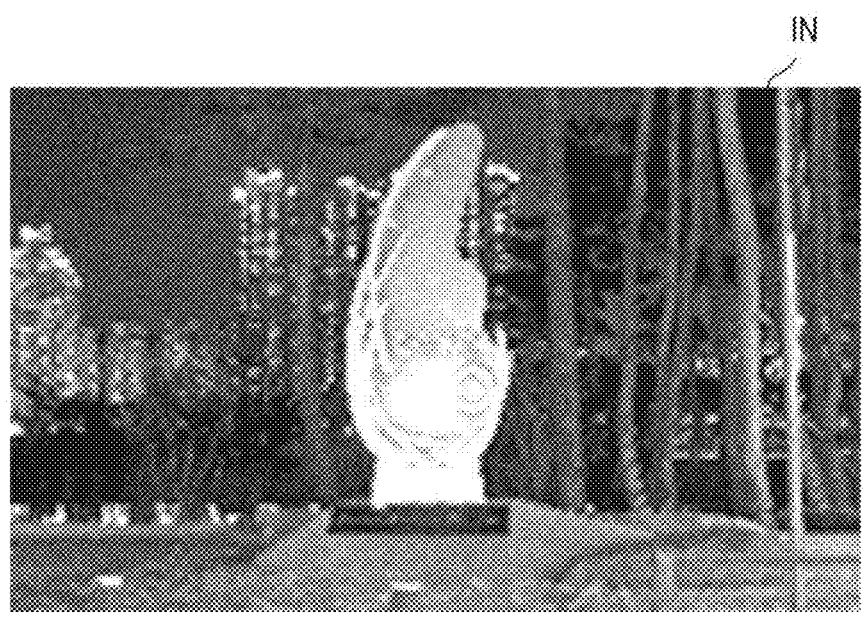
FIGS. 3 and 4 are diagrams illustrating examples of a pixel grading operation of a defective pixel correction device according to an example embodiment.
Figure 4:
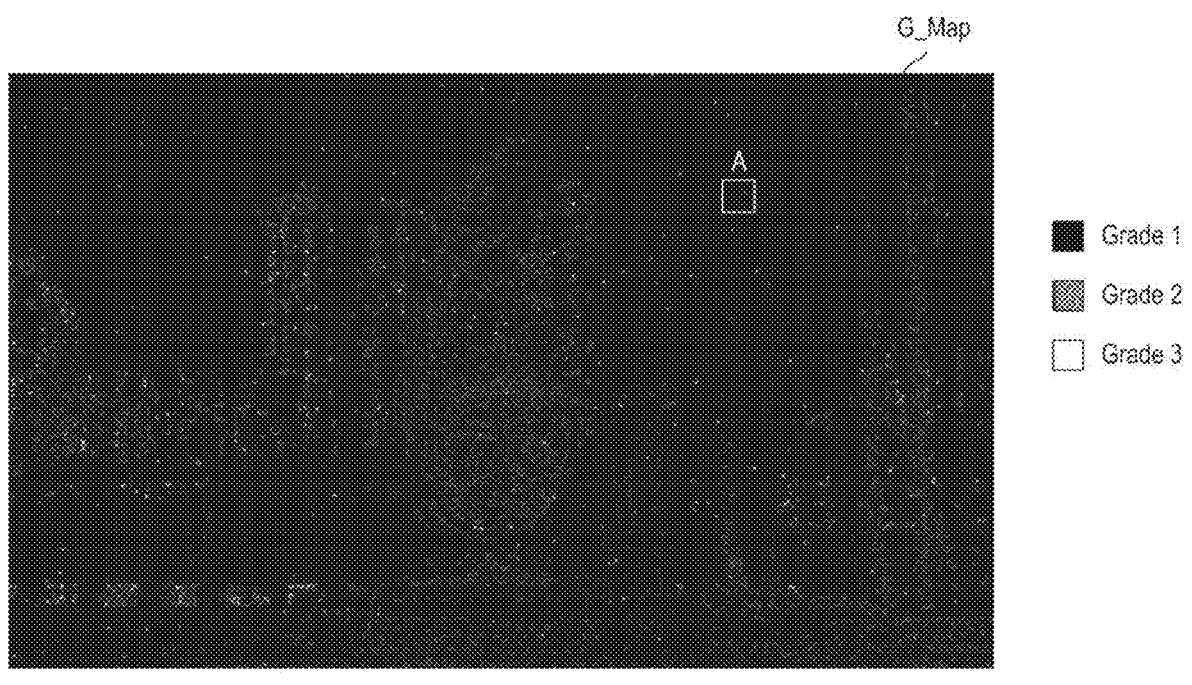
Figure 5:
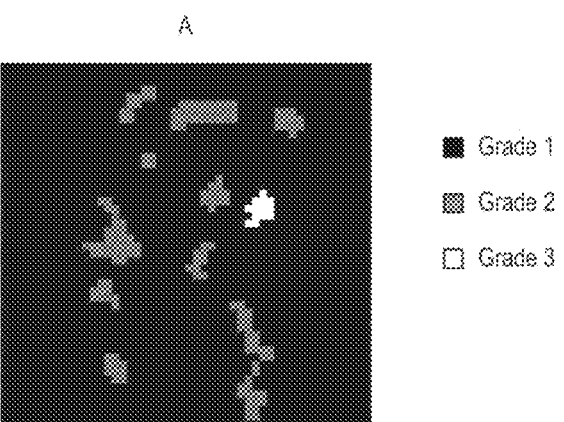
FIG. 5 is an enlarged view of region "A" of FIG. 4.

FIGS. 3 and 4 are diagrams illustrating various examples of a pixel grading operation of a defective pixel correction device, and FIG. 5 is an enlarged view of region "A" of FIG. 4 and illustrates the grade map G_Map more clearly. Hereinafter, descriptions of redundant details will be omitted.

As an example, the defective pixel correction device 2100a may obtain the grade map G_Map based on the input image IN corresponding to FIG. 3 into of FIG. 4. For example, the defective pixel correction device 2100a may respectively assign each of a plurality of pixels, included in the input image IN, to one of three grades (first to third grades) and may then output a grade map G_Map based on the assigned grades. In FIGS. 4 and 5, the first grade may be represented by black and may be a grade determined to be free from defects, the second grade may be represented by gray and may be determined to be significantly less likely to be defective, and the third grade may be represented by white and may be a grade determined to be highly likely to be defective. For example, it will be understood that strength of overall correction for the input image IN is determined depending on whether the second grade is set as a correction level, a criterion for selecting the candidate pixel CAN_P. For example, the strength of overall correction may be relatively low when only the third grade is set as a correction level for selecting the candidate pixel CAN_P, and the strength of overall correction may be relatively high when both the second grade and the third grade are set as a correction level for selecting the candidate pixel CAN_P.

For example, the defective pixel correction device 2100a may assign the first grade to a target pixel based on satisfaction of a first condition defined as a difference between a pixel value of the target pixel and an average value or a median value of the neighboring pixels being less than a first threshold value.

For example, the defective pixel correction device 2100a may assign the third grade to the target pixel based on satisfaction of a second condition defined as a difference between the pixel value of the target pixel and the average value or the median value of the neighboring pixels being greater than or equal to a second threshold value. Also, the defective pixel correction device 2100a may assign the third grade to the target pixel based on satisfaction of at least one of an additional condition defined, as a difference between the pixel value of the target pixel and a minimum value of the neighboring pixels being less than a third threshold value, and an additional condition defined as a difference between the pixel value of the target pixel and a maximum value of the neighboring pixels being less than the third threshold value, other than the second condition.

For example, the defective pixel correction device 2100a may assign the second grade to the target pixel based on the target pixel satisfying neither the first condition nor the second condition.

As described above, the first to third threshold values for assigning the first to third grades may be set according to various example embodiments. For example, the first to third thresholds may be preset values. Alternatively, the first to third threshold values may be values calculated based on pixels neighboring the target pixel. For example, at least one of the first to third thresholds may be calculated as a value corresponding to a specific ratio of an average values of the neighboring pixels.

In the case of FIGS. 4 and 5, the third grade having a high likelihood of defects accounts for a lowest ratio in the entire grade map G_Map. Therefore, the strength of correction may be determined depending on whether the second level having a lower likelihood of defects than the third level is set as a correction level, a criterion for selecting the candidate pixel CAN_P. For example, it will be understood that when the correction level is set to include both the third grade and the second grade, the strength of correction is somewhat high, and when the correction level is set to include only the third grade, the strength of correction is somewhat low.

FIGS. 3 to 5 are provided as examples, and the defective pixel correction device 2100a according to example embodiment may perform pixel grading based on not only three grades but also less than three grades or more than three degrees.

Figure 6:
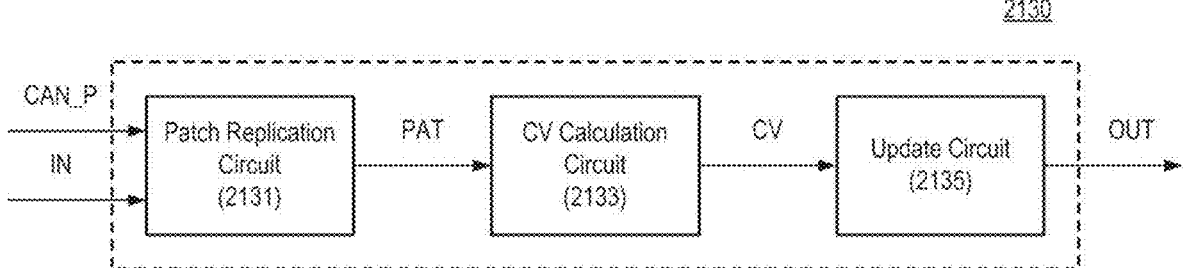
FIG. 6 is a diagram illustrating a correction circuit according to an example embodiment.

FIG. 6 is a diagram illustrating a correction circuit according to an example embodiment.

Referring to FIG. 6, a correction circuit 2130 according to an example embodiment may include a patch replication circuit 2131, a correction value calculation circuit 2133, and an update circuit 2135.

The patch replication circuit 2131 may replicate an image patch PAT generated based on an input image IN and a candidate pixel CAN_P. For example, the patch replication circuit 2131 may replicate only the image patch PAT which may be applied to the candidate pixel CAN_P, among pixels included in the input image IN. For example, the image patch PAT may have a size of M×N based on a single candidate pixel CAN_P, as described above. The image patch PAT may be duplicated for each of one or more candidate pixels CAN_P in the image patch PAT. The duplicated image patch PAT may be used to perform the correction operation of the correction circuit 2130 on each of the one or more candidate pixels CAN_P in the image patch PAT in parallel.

The correction value calculation circuit 2133 may calculate a correction value CV for each of the one or more candidate pixels CAN_P. The correction value calculation circuit 2133 may calculate correction values CV based on pixel information (for example, pixel values of the candidate pixel CAN_P and neighboring pixels, colors corresponding to the pixel values, assigned grades, the number of valid pixels among all pixels, or the like) of the one or more candidate pixels CAN_P included in the replicated image patch PAT.

The update circuit 2135 may update pixel values of the one or more candidate pixels CAN_P to corrected pixels C_P1 to C_Pn based on the correction value CV. All of the candidate pixels CAN_P, included in the input image IN, may be replaced with corrected pixels through the update circuit 2135. The update circuit 2135 may output an output image OUT including the corrected pixels.

Figure 7:
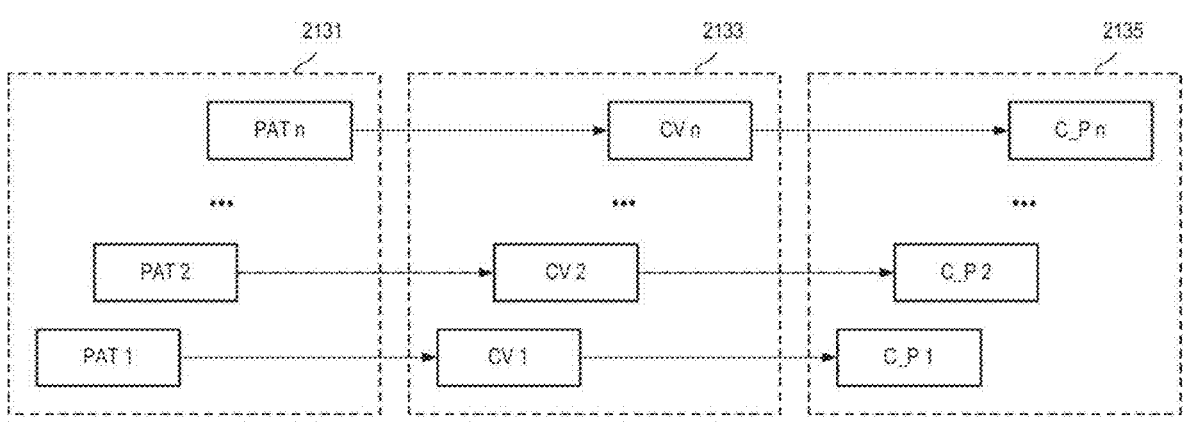
FIG. 7 is a diagram illustrating an operation of the correction circuit of FIG. 6 according to an example embodiment.

FIG. 7 is a diagram illustrating an operation of the correction circuit of FIG. 6.

Referring to FIG. 7, the correction circuit 2130 according to an example embodiment may perform a parallel operation on the duplicated image patch PAT.

For example, when the number of candidate pixels CAN_P is n (where n is a positive integer), the patch replication circuit 2131 may replicate the image patch PAT n times to obtain n image patches PAT1 to PATn. The correction value calculation circuit 2133 may calculate correction values CV1 to CVn for each of the duplicated image patches PAT1 to PATn and the candidate pixels CAN_P, and may perform parallel calculation of the correction values CV1 to CVn for all of the candidate pixels CAN_P. In this case, an operation of calculating a correction value for each of the candidate pixels CAN_P may be independent of other operations. For example, one of the correction values CV1 to CVn calculated for one candidate pixel CAN_P may not be used in an operation of calculating another one of the correction values CV1 to CVn for another candidate pixel CAN_P. The update circuit 2135 may obtain the correction values CV1 to CVn from the correction value calculation operation performed for the candidate pixels CAN_P in parallel, and may update the candidate pixels CAN_P to the correction values CV1 to CVn. Accordingly, all of the candidate pixels may be updated to corrected pixels C_P1 to C_Pn.

According to the above-described embodiments, the candidate pixels CAN_P have already been selected through pixel grading before correcting defective pixels, so that a parallel correction operation may be performed with less system load. Thus, according to example embodiments, a correction operation speed may be increased. In addition, the correction operation is performed on only the candidate pixels CAN_P, so that power consumption may be reduced.

Figure 8:
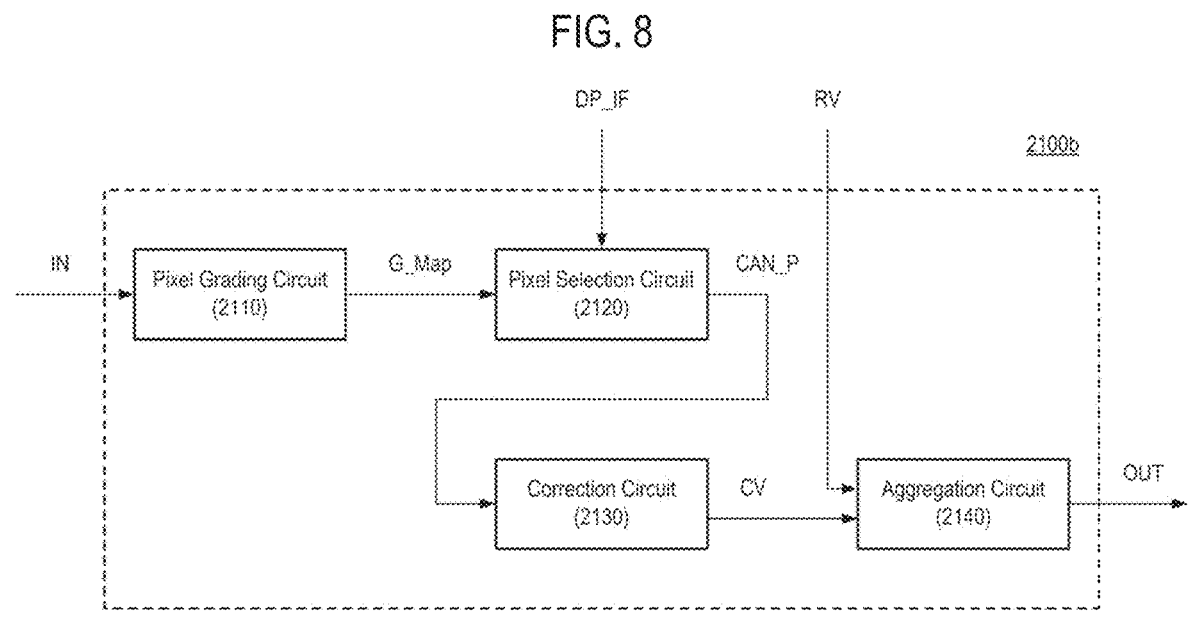
Figure 9:
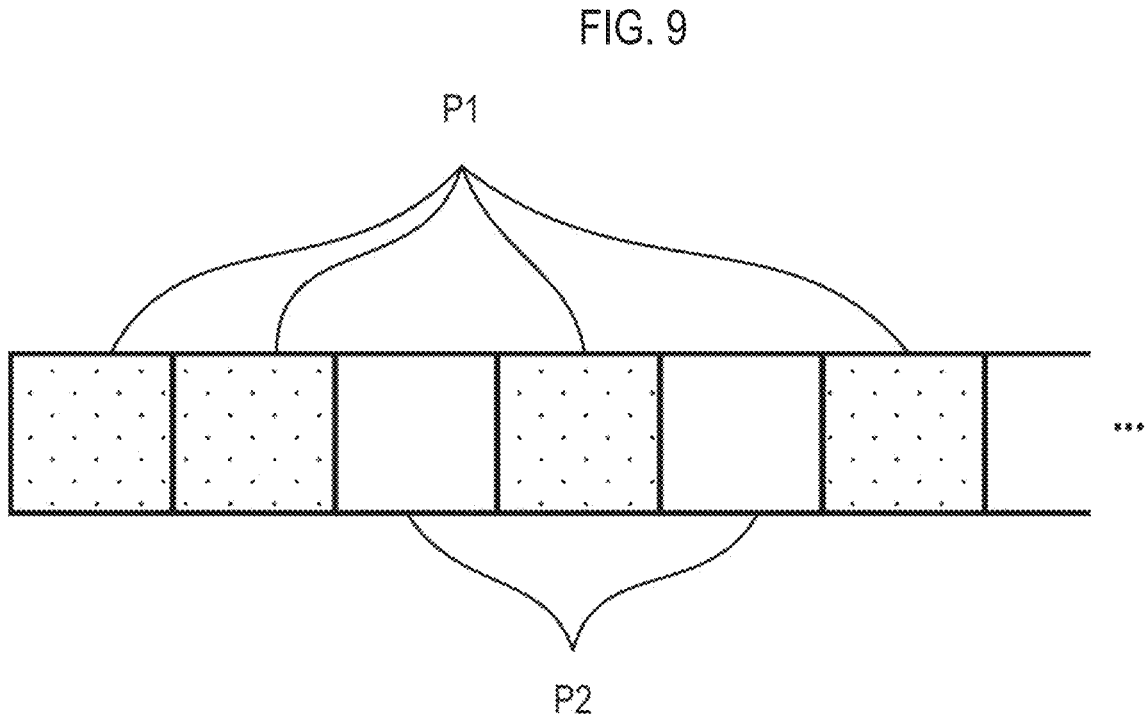
FIG. 9 is a diagram illustrating a portion of an output image output through an aggregation circuit of FIG. 8 according to an example embodiment.

FIG. 8 is a diagram illustrating a defective pixel correction device according to an example embodiment, and FIG. 9 is a diagram illustrating a portion of an output image output through an aggregation circuit of FIG. 8.

Referring to FIG. 8, a defective pixel correction device 2100b according to an example embodiment further includes an aggregation circuit 2140, in addition to a pixel grading circuit 2110, a pixel selection circuit 2120, and a correction circuit 2130.

As described above, the pixel grading circuit 2110 may perform pixel grading on an input image IN, the pixel selection circuit 2120 may select a candidate pixel CAN_P based on an assigned grade, and the correction circuit 2130 may perform a correction operation on the candidate pixel CAN_P.

In this case, the pixel selection circuit 2120 according to an example embodiment may select a pixel corresponding to the correction level as a candidate pixel CAN_P according to the above-described embodiments, or may receive defective pixel information DP_IF from another device connected to the defective pixel correction device 2100b. For example, the defective pixel information DP_IF may be information possessed by the image sensor of FIG. 1 and may be obtained by the defective pixel correction device 2100b from the image sensor. The defective pixel information DP_IF may include information on pixels, previously determined as defective pixels, among pixels included in the pixel array of FIG. 1. For example, a defective pixel indicated by the defective pixel information DP_IF may be a pixel that has already been determined as a defective pixel during a process of an image sensor, and may be referred to as a static bad pixel BP.

The pixel selection circuit 2120 receiving the defective pixel information DP_IF may select a pixel, indicated by the defective pixel information DP_IF, as a candidate pixel CAN_P regardless of grade.

The aggregation circuit 2140 may be configured to select either one of a correction value CV and a reference value RV for the candidate pixel CAN_P. The reference value RV may be received from another device connected to the defective pixel correction device 2100b. Another device may be configured to perform a pixel correction function, separately from the defective pixel correction device 2100b according to an example embodiment. Accordingly, the reference value RV may also replace the candidate pixel CAN_P. For example, at least one reference value RV may be present in an output image.

In an example embodiment, the aggregation circuit 2140 may compare a difference between a pixel value of the candidate pixel CAN_P before being corrected and the correction value CV, and a difference between the pixel value of the candidate pixel CAN_P before being corrected and the reference value RV, and may select either one, showing a greater difference, of the correction value CV and the reference value RV. For example, the aggregation circuit 2140 may select a single pixel value, having a greater correction effect, from among pixel values derived through different correction processes.

For example, as illustrated in FIG. 9, an output image OUT may be output in a form, in which the correction value CV and the reference value RV are mixed, through the aggregation circuit 2140. In the first pixels P1 output as the correction value CV, a correction value caused by the correction value CV is greater than a correction value caused by the reference value RV, so that the aggregation circuit 2140 may select the correction value CV. On the other hand, in the second pixels P2 output as the reference value RV, a correction value caused by the reference value RV is greater than a correction value caused by the correction value CV, so that the aggregation circuit 2140 may select the reference value RV.

In an example embodiment, the aggregation circuit 2140 may be implemented as a multiplexer (MUX). When the aggregation circuit 2140 is implemented as a MUX, the aggregation circuit 2140 may receive a select signal from another device connected to the defective pixel correction device 2100b and may select one of the correction value CV and the reference value RV based on the received select signal. In this case, the select signal may indicate a single pixel, whose correction value CV is greater than the reference value RV, among the candidate pixels CAN_P.

According to the above-described embodiment, the defective pixel correction device 2100b may aggregate a defective pixel correction process through pixel grading with another correction process. For example, the correction value CV may be selected for each candidate pixel CAN_P through a correction process having a high correction value CV, so that performance of defective pixel correction may be improved.

FIG. 10 is a flowchart illustrating a method of operating a defective pixel correction device according to an example embodiment.

Referring to FIG. 10, in operation S110, the defective pixel correction devices 2100*a* and 2100*b* may perform pixel grading to assign one of a plurality of grades, indicating defect levels, to a plurality of pixels included in an input image IN. The pixel grading may be performed through above-described various embodiments. For example, the defective pixel correction devices 2100*a* and 2100*b* may sort pixel values of a target pixel and neighboring pixels included in an image patch PAT, and may assign a grade of the target pixel based on the amount of a difference between the pixel value of the target pixel and an average value, a median value, a maximum value, and/or a minimum value of the sorted pixel values.

In operation S120, the defective pixel correction devices 2100*a* and 2100*b* may output a grade map G_Map including a plurality of pixels to which a grade is assigned. Each pixel included in the grade map G_Map may be mapped to the grade assigned through operation S110, rather than a pixel value.

In operation S130, the defective pixel correction devices 2100*a* and 2100*b* may select one or more candidate pixels CAN_P, having a grade corresponding to correction level, in the grade map G_Map. For example, the defective pixel correction devices 2100*a* and 2100*b* may select a pixel, having an assigned grade corresponding to the correction level, as a candidate pixel CAN_P.

Alternatively, the method may further include receiving defective pixel information from another connected device. For example, a defective pixel indicated by the defective pixel information may be a pixel that has already been determined to be defective during a process of an image sensor. Accordingly, when receiving the defective pixel information, the defective pixel correction devices 2100*a* and 2100*b* may select a pixel indicated by the defective pixel information as the candidate pixel CAN_P regardless of the grade, regardless of operation S130.

In operation S140, the defective pixel correction devices 2100*a* and 2100*b* may correct the selected one or more candidate pixels CAN_P.

FIG. 11 is a flowchart illustrating an operation of selecting a candidate pixel of the defective pixel correction device according to an example embodiment.

Referring to FIG. 11, in operation S210, the defective pixel correction devices 2100*a* and 2100*b* may set at least one grade, among a plurality of grades, as a correction level to correct. The defective pixel correction devices 2100*a* and 2100*b* may set a correction level according to various embodiments. For example, the correction level may be preset to one or more grades, among a plurality of grades (in this case, operation S210 may be omitted). Alternatively, the correction level may be dynamically set. For example, the defective pixel correction devices 2100*a* and 2100*b* may also set at least one grade, among a plurality of grades, as a correction level based on a ratio of the plurality of grades in the grade map G_Map. For example, the defective pixel correction devices 2100*a* and 2100*b* may set a correction level based on information associated with a state of an input image IN.

In operation S220, the defective pixel correction devices 2100*a* and 2100*b* may determine whether the single assigned grade corresponds to the correction level. When the grade does not satisfy the correction level, the defective pixel correction devices 2100*a* and 2100*b* may determine the target pixel as a normal pixel. Alternatively, when the grade corresponds to the correction level, the defective pixel correction devices 2100*a* and 2100*b* may determine the target pixel as a candidate pixel CAN_P.

FIG. 12 is a flowchart of a correction operation of a defective pixel correction device according to an example embodiment.

Referring to FIG. 12, in operation S310, the defective pixel correction devices 2100*a* and 2100*b* may replicate an image patch PAT for one or more candidate pixels CAN_P. For example, operation S310 may be performed only on one or more candidate pixels CAN_P selected through operation S130. The image patch PAT may be replicated from the input image IN by the number of candidate pixels CAN_P with respect to the candidate pixel CAN_P.

In operation S320, the defective pixel correction devices 2100*a* and 2100*b* may calculate a correction value CV based on the one or more candidate pixels CAN_P and a plurality of neighboring pixels included in the image patch PAT. In operation S330, the defective pixel correction devices 2100*a* and 2100*b* may update a pixel value of the candidate pixel CAN_P to the correction value CV calculated through operation S320. In this case, operations S320 and S330 may be performed in parallel for the one or more candidate pixels CAN_P based on the image patch PAT replicated in advance through operation S310.

Figure 13:
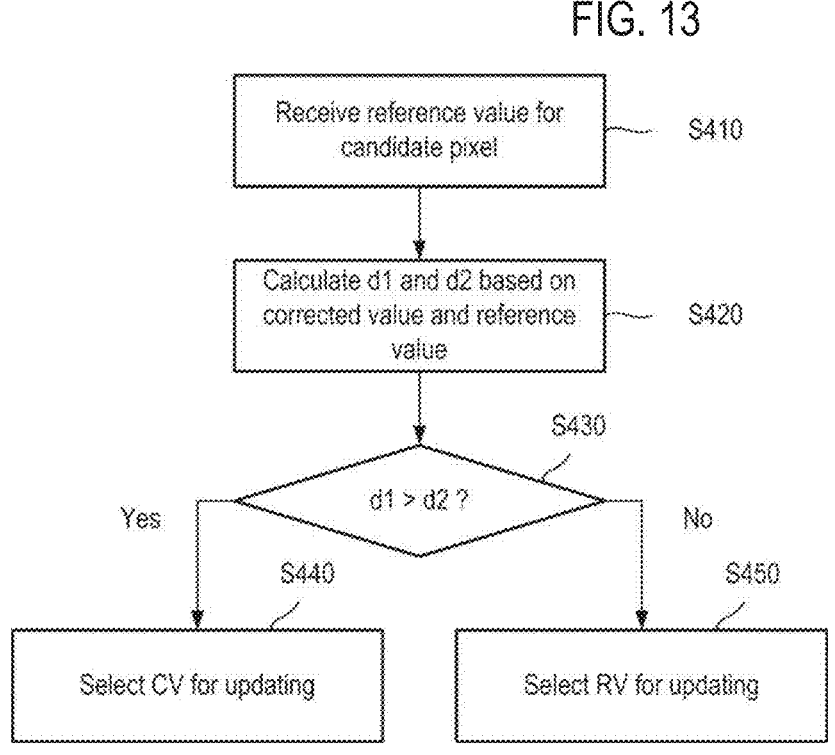
FIG. 13 is a flowchart illustrating an aggregation operation of a defective pixel correction device according to an example embodiment.

FIG. 13 is a flowchart illustrating an aggregation operation of a defective pixel correction device according to an example embodiment.

Referring to FIG. 13, in operation S410, the defective pixel correction devices 2100*a* and 2100*b* may receive a reference value RV for one or more candidate pixels CAN_P. For example, the reference value RV may be received from another device connected to the defective pixel correction devices 2100*a* and 2100*b* and configured to perform a pixel correction function, separately from the defective pixel correction devices 2100*a* and 2100*b*. For example, at least one reference value RV may be present.

In operation S420, the defective pixel correction devices 2100*a* and 2100*b* may calculate a difference d1 between a pixel value the candidate pixel CAN_P before being corrected and the correction value CV, and a difference d2 between the pixel value of the candidate pixel CAN_P before being corrected and the reference value RV.

In operation S430, the defective pixel correction devices 2100*a* and 2100*b* may determine whether the calculated difference d1 is greater than the calculated difference d2. When the difference d1 is greater than the difference d2, the flow proceeds to operation S440 in which the defective pixel correction devices 2100*a* and 2100*b* may select the correction value CV as a value for updating. Alternatively, when the difference d1 is smaller than the difference d2, the flow proceeds to operation S450 in which the defective pixel correction devices 2100*a* and 2100*b* may select the reference value RV as a value for updating.

Therefore, the aggregation operation according to an example embodiment is advantageous in that when the defective pixel correction devices 2100*a* and 2100*b* and another device separately performing a pixel correcting function are present and have different correction performances for a single target pixel, the defective pixel correction devices 2100*a* and 2100*b* may have select a single value with highest performance as an output value.

Figure 14:
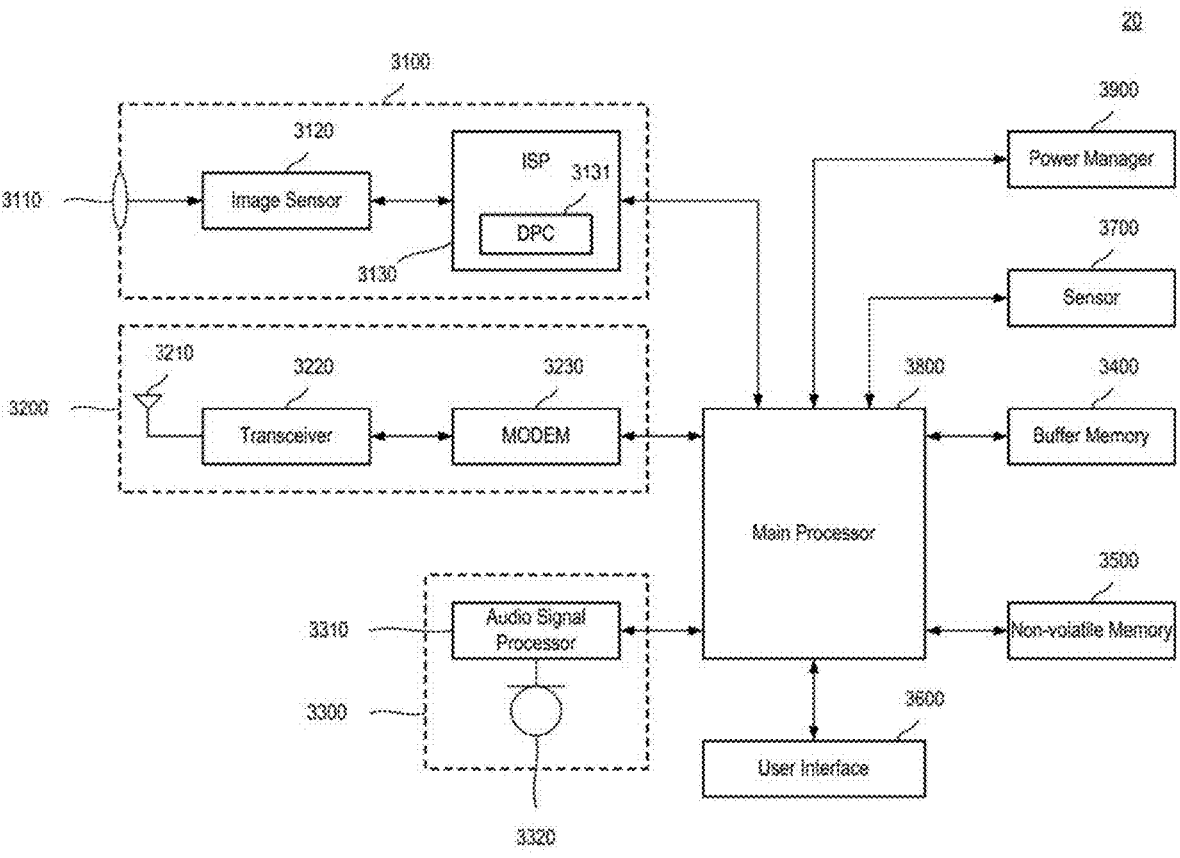
FIG. 14 is a diagram illustrating an electronic device according to an example embodiment.

FIG. 14 is a diagram illustrating an electronic device according to an example embodiment.

Referring to FIG. 14, an electronic device 20 according to an example embodiment may include an image processing device 3100, a communication device 3200, an audio processing device 3300, a buffer memory 3400, a nonvolatile memory 3500, a user interface 3600, a sensor 3700, a main processor 3800 and a power manager 3900. In some embodiments, the image signal processor 3130 may be provided as a portion of the image sensor 3120, provided on a circuit or a chip separate from the image processing device 3100, and/or provided as a portion of the main processor 3800.

The image sensor 3120 may capture an image through a lens 3110, and may output a digital signal corresponding to the captured image, for example, an input image IN.

The image signal processor 3130 may perform various processes on signals output from the image sensor 3120. For example, the image signal processor 3130 according to an example embodiment may include a defective pixel correction device 3131. According to the above-described various embodiments, the defective pixel correction device 3131 may output a grade map G_Map including a plurality of pixels to which a grade is assigned, select one or more candidate pixels CAN_P having a grade corresponding to a correction level in the grade map G_Map, and correct the selected one or more candidate pixel CAN_P based on a grade, among a plurality of grades indicating defect levels, being assigned to the plurality of pixels included in the input image IN.

A restored digital signal, output by the image signal processor 3130, may be output to the main processor 3800.

The communication device 3200 may exchange signals with an external device/system through an antenna 3210. A transceiver 3220 and a modulator/demodulator (MODEM) 3230 of the communication device 3200 may process the exchanged signals according to various communication protocols. For example, the transceiver 3220 and the MODEM 3230 of the communication device 3200 may process the signals exchanged with the external device/system according to wireless communication protocols such as long term evolution (LTE), worldwide interoperability for microwave access (WIMAX), global system for mobile communication (GSM), code division multiple access (CDMA)), Bluetooth, near field communication (NFC), wireless fidelity (Wi-Fi), radio frequency identification (RFID), or the like. In some embodiments, the communication device 3200 may be provided as a portion of the main processor 3800.

The audio processing device 3300 may process sound information using the audio signal processor 3310. The audio processing device 3300 may receive audio input through the microphone 3320, or may output audio through a speaker 3330.

The buffer memory 3400 may temporarily store data used for an operation of the electronic device 20 (for example, data processed or to be processed by the main processor 3800). For example, the buffer memory 3400 may include volatile/nonvolatile memories such as a static random access memory (SRAM), a dynamic RAM (DRAM), a synchronous DRAM (SDRAM), a phase-change RAM (PRAM), a magnetoresistive RAM (MRAM), a resistive RAM (Re-RAM), a ferroelectric RAM (FRAM), or the like.

As an example, an image captured by the image processing device 3100 may be stored in the buffer memory 3400. An image stored in the buffer memory 3400 may be subjected to high dynamic range (HDR) processing by the main processor 3800.

The nonvolatile memory 3500 may store data, regardless of power supply. As an example, the nonvolatile memory 3500 may include nonvolatile memories such as a flash memory, a PRAM, an MRAM, an ReRAM, an FRAM, or the like. As an example, the nonvolatile memory 3500 may include a removable memory such as a hard disk drive (HDD), a solid state drive (SSD), a secure digital (SD) card, or a universal flash storage (UFS) card, and/or an embedded memory such as an embedded multimedia card (eMMC).

The user interface 3600 may mediate communication between a user and the electronic device 20. As an example, the user interface 3600 may include an input interface such as a keypad, a button, a touchscreen, a touchpad, a vision sensor, a motion sensor, a gyroscope sensor, or the like. As an example, the user interface 3600 may include an output interface such as an organic LED (OLED) display device, an active matrix OLED (AMOLED) display device, a light emitting diode (LED) display device, a liquid crystal display (LCD) device, a motor, an LED lamp, or the like.

The sensor 3700 may detect various types of physical energy provided from the outside of the electronic device 20. As an example, the sensor 3700 may detect a transfer medium of physical energy such as temperature, voice, or light. As an example, the sensor 3700 may detect illuminance and transmit data, representing the detected illuminance, to the main processor 3800.

The main processor 3800 may process various operations to control the overall operation of the electronic device 20. The main processor 3800 may be implemented as a general purpose processor, a specific purpose processor, or an application processor, and may include one or more processor cores. The main processor 3800 may control the image processing device 3100 to obtain image data on an object outside the electronic device 20. As an example, the main processor 3800 may synthesize an HDR image based on an image associated with a low conversion gain and an image associated with a high conversion gain provided from the image processing device 3100.

The power manager 3900 may appropriately convert power received from a battery and/or an external power supply. The power manager 3900 may supply the converted power to components of the electronic device 20.

Figure 15:
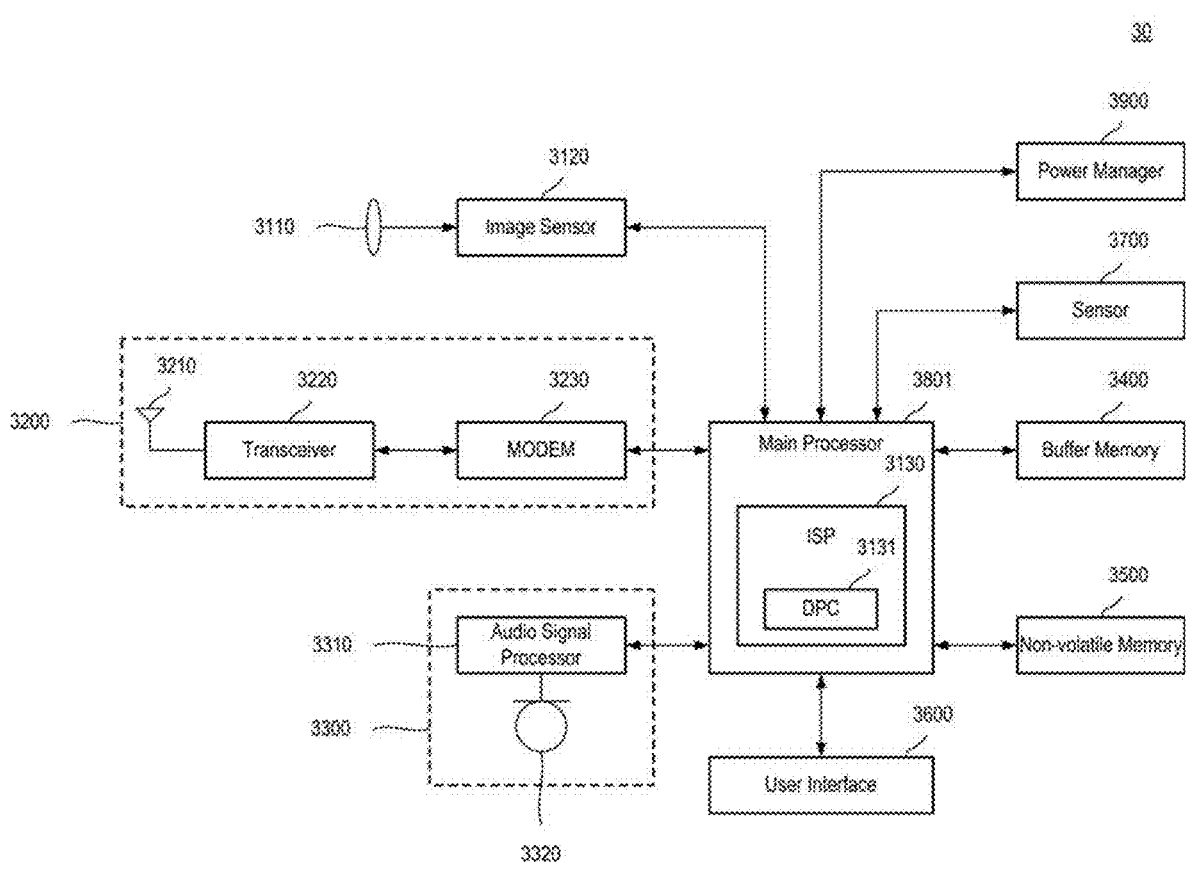
FIG. 15 is a diagram illustrating an electronic device according to an example embodiment.

FIG. 15 is a diagram illustrating an electronic device according to an example embodiment.

Referring to FIG. 15, an image signal processor 3130 may be provided as a portion of a main processor 3801 in an example embodiment. The image signal processor 3130 may perform various processes on signals output from an image sensor 3120. For example, the image signal processor 3130 according to an example embodiment may include a defective pixel correction device 3131. According to the above-described various embodiments, the defective pixel correction device 3131 may output a grade map G_Map including a plurality of pixels to which a grade is assigned, select one or more candidate pixels CAN_P having a grade corresponding to a correction level in the grade map G_Map, and correct the selected one or more candidate pixel CAN_P based on a grade, among a plurality of grades indicating defect levels, being assigned to the plurality of pixels included in the input image IN. A restored digital signal output by the image signal processor 3130 may be output to the main processor 3801.

As described above, any electronic device and/or a portion thereof according to any example embodiment may be implemented through one or more instances of processing circuitry such as hardware including logic circuits, a combination of hardware and software such as a processor for executing software, or combinations thereof.

As set forth above, according to example embodiments, a defective pixel correction device and a method of operating the same may be provided.

In some embodiments, each of the components represented by a block as illustrated in FIGS. 1, 2, 6-8, 14 and 15 may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been shown and described above, it will be apparent to those skilled in the art that modifications and variations could be made without departing from the scope of the appended claims.

What is claimed is:

1. A defective pixel correction device comprising:
a pixel grading circuit configured to output a grade map comprising a plurality of grades indicating defect levels and respectively corresponding to a plurality of pixels included in an input image, wherein the plurality of pixels comprises red pixels, green pixels and blue pixels arranged in a regular pattern;
a pixel selection circuit configured to select one or more candidate pixels from among the plurality of pixels, based on whether the plurality of grades correspond to a correction level, in the grade map; and
a correction circuit configured to:
calculate one or more correction values based on the one or more candidate pixels and a plurality of neighboring pixels included in an image patch, wherein the image patch includes the one or more candidate pixels;
correct the one or more candidate pixels based on the one or more correction values; and
replicate the image patch for each of the one or more candidate pixels.

2. The defective pixel correction device of claim 1, wherein the pixel grading circuit is further configured to assign a grade to a target pixel of the plurality of pixels based on an average value or a median value of a plurality of neighboring pixels included in an image patch being compared with a pixel value of the target pixel.

3. The defective pixel correction device of claim 2, wherein the pixel grading circuit is further configured to:
assign a first grade as the grade of the target pixel based on satisfaction of a first condition in which a difference between the pixel value and the average value or the median value is less than a first threshold value;
assign a third grade as the grade of the target pixel based on satisfaction of a second condition in which the difference between the pixel value and the average value or the median value is greater than a second threshold value; and
assign a second grade as the grade of the target pixel based on the target pixel satisfying neither the first condition nor the second condition.

4. The defective pixel correction device of claim 3, wherein the correction level comprises at least one of the second grade and the third grade.

5. The defective pixel correction device of claim 1, wherein the pixel selection circuit is further configured to set at least one of the plurality of grades to the correction level based on a ratio of one of the plurality of grades in the grade map to another one of the plurality of grades in the grade map.

6. The defective pixel correction device of claim 1, wherein the correction circuit is further configured to calculate the one or more correction values for the one or more candidate pixels and the correcting for the one or more candidate pixels in parallel.

7. The defective pixel correction device of claim 1, further comprising a replication circuit configured to select one of a correction value and a reference value for each of the one or more candidate pixels.

8. The defective pixel correction device of claim 7, wherein the replication circuit is further configured to:
compare a first difference between one or more pixel values of the one or more candidate pixels before being corrected and the correction value, and a second difference between the one or more pixel values and the reference value; and
select the correction value based on the first difference being greater than the second difference, and select the reference value based on the first difference not being greater than the second difference.

9. The defective pixel correction device of claim 1, wherein the regular pattern is a Bayer pattern.

10. A method of operating a defective pixel correction device, the method comprising:
assigning a plurality of grades, among grades indicating defect levels, to a plurality of pixels included in an input image, respectively, wherein the plurality of pixels comprises red pixels, green pixels and blue pixels arranged in a regular pattern;
outputting a grade map comprising the plurality of grades;
selecting one or more candidate pixels from among the plurality of pixels, based on whether the plurality of grades correspond to a correction level, in the grade map;
correcting the one or more candidate pixels;
replicating an image patch for each of the one or more candidate pixels; and
calculating one or more correction values based on the one or more candidate pixels and a plurality of neighboring pixels included in the image patch.

11. The method of claim 10, further comprising:
setting at least one of the plurality of grades to the correction level;
determining which of the plurality of grades correspond to the correction level; and
selecting the one or more candidate pixels based on which of the plurality of grades correspond to the correction level.

12. The method of claim 10, further comprising:
receiving a reference value for the one or more candidate pixels;

calculating a first difference between one or more pixel values of the one or more candidate pixels before being corrected and correction value of the one or more correction values, and a second difference between the one or more pixel values of the one or more candidate pixels before being corrected and the reference value; and selecting the correction value based on the first difference being greater than the second difference, and selecting the reference value based on the first difference not being greater than the second difference.

13. The method of claim 10, wherein the calculating the one or more correction values and the correcting are performed for the one or more candidate pixels in parallel.

14. The method of claim 11, wherein the correction level is set based on a ratio of each of the plurality of grades in the grade map.

15. An electronic device comprising:

an image sensor comprising red pixels, green pixels and blue pixels arranged in a regular pattern;

a pixel grading circuit configured to output a grade map comprising a plurality of pixels to which a grade, among a plurality of grades indicating defect levels, is assigned, based on the grade being assigned, wherein the plurality of pixels are included in an input image output from the image sensor;

a pixel selection circuit configured to select one or more candidate pixels, having the grade corresponding to a correction level, in the grade map; and a correction circuit configured to:

calculate one or more correction values based on the one or more candidate pixels and a plurality of neighboring pixels included in an image patch, wherein the image patch includes the one or more candidate pixels;

correct the one or more candidate pixels based on the one or more correction values; and replicate the image patch for each of the one or more candidate pixels.

16. The electronic device of claim 15, wherein the pixel selection circuit is further configured to set at least one of the plurality of grades to the correction level based on a ratio of one of the plurality of grades in the grade map to another one of the plurality of grades in the grade map.

* * * * *